United States Patent
Serrano

[15] 3,674,963
[45] July 4, 1972

[54] MEASUREMENT APPARATUS HAVING NON-CONTACT ELECTRICAL COUPLING TO COMPONENTS ON A MOVING SURFACE

[72] Inventor: Leonardo V. Serrano, Minneapolis, Minn.
[73] Assignee: Rosemount Inc., Eden Prairie, Minn.
[22] Filed: Oct. 19, 1970
[21] Appl. No.: 81,852

[52] U.S. Cl. ..........................219/10.61, 219/471, 219/494, 73/351
[51] Int. Cl. ......................................................H05b 5/00
[58] Field of Search ...................219/10.61, 10.75, 471, 494; 73/351, 362

[56] References Cited

UNITED STATES PATENTS

| | | | |
|---|---|---|---|
| 2,294,339 | 8/1942 | Hofmann et al. | 73/351 |
| 3,324,724 | 6/1967 | Essers et al. | 73/362 |
| 3,331,945 | 7/1967 | Ishikawa et al. | 219/471 |
| 3,463,893 | 8/1969 | Chifu | 219/10.61 |
| 3,500,019 | 3/1970 | Childress | 219/471 |

*Primary Examiner*—Volodymyr Y. Mayewsky
*Attorney*—Dugger, Peterson, Johnson & Westman

[57] ABSTRACT

A system for measuring temperature sensed by a resistance thermometer attached to a moving structure. Impedance of the resistance thermometer is coupled into an AC bridge and a variable resistor is also coupled into the bridge to balance the bridge when the thermometer changes in impedance due to temperature change. The resistance of the variable resistor is sensed by DC circuitry and a resultant DC signal proportional to temperature is thus provided.

12 Claims, 3 Drawing Figures

PATENTED JUL 4 1972
3,674,963
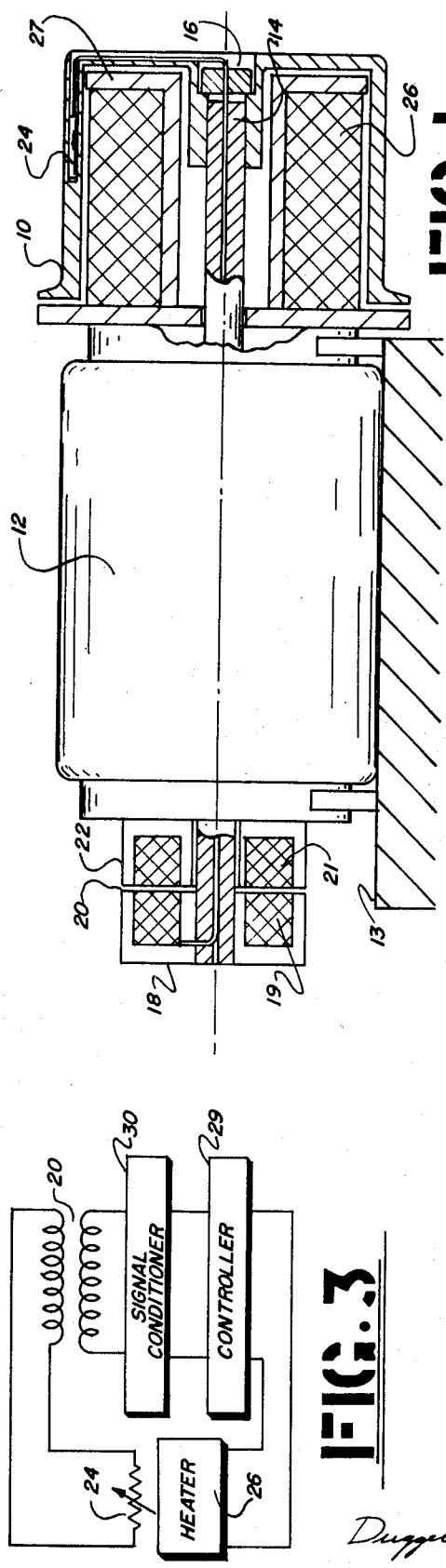
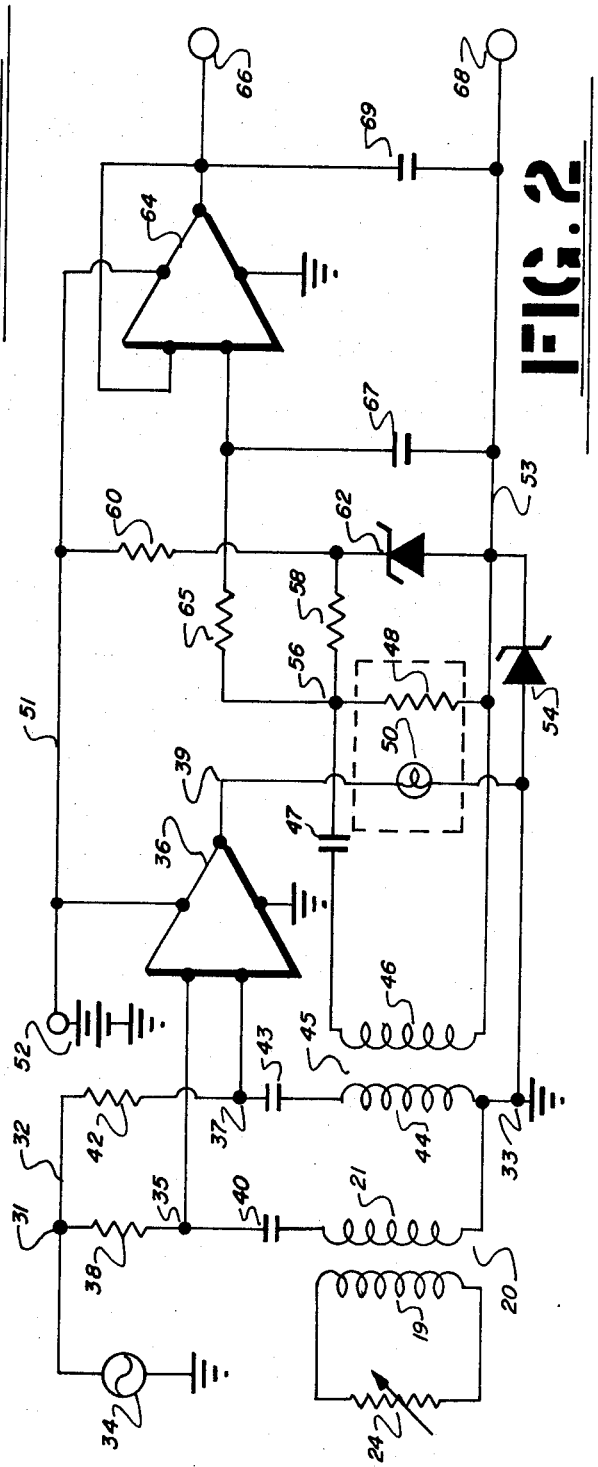
INVENTOR.
LEONARDO V. SERRANO
BY
Dugger, Peterson, Johnson & Westman

MEASUREMENT APPARATUS HAVING NON-CONTACT ELECTRICAL COUPLING TO COMPONENTS ON A MOVING SURFACE

BACKGROUND OF THE INVENTION

1. Field of the Invention

The invention relates to electrical circuits for measurement, from a stationary structure, of an impedance circuit mounted on a movable structure. More specifically the invention relates to temperature measurement of a moving element by means of a temperature sensor mounted on the moving element and monitored through non-contact coupling means by circuits mounted on the stationary structure.

2. Prior Art

The problem of obtaining a precise temperature measurement of a relatively moving structure is severe and various solutions have been attempted. A platinum resistance thermometer is generally considered to be the preferred temperature sensor for most precise measurements. However, faithful transmission of an electric signal from the temperature sensor to another part of the structure which is in relative motion with the temperature sensor is difficult.

A relevant prior art solution is described in the National Bureau of Standards Technical News Bulletin, December 1954, pages 180–183 where platinum resistance sensors are embedded in turbine blades and a measurement of sensor resistance is effected through sets of inductive coils mounted on moving and stationary machine parts respectively and providing intermittent coupling so that a number of temperatures may be measured sequentially. Each sensor of that design was in parallel with an input and output coil mounted in the rotating structure so that the coupling to fixed coils was dependent upon resistance and hence an excitation signal coupled through these coils by means of fixed coils was used to measure resistance.

U.S. Pat. No. 3,463,893 uses one non-contacting coupling means for supplying electrical energy to a sensor on a rotating structure and another non-contacting coupling means for receiving a signal from sensor circuits on the rotating structure.

U.S. Pat. No. 3,324,724 shows a temperature measuring system for relatively moving structures which employs a non-contact coupling means and uses energy absorption metering by having a passive transducer load on an inductive coil which is coupled to the measuring circuits.

SUMMARY OF THE INVENTION

An impedance bridge is energized by an AC source generator. One arm of the bridge is inductively coupled to circuitry including a first resistor mounted on the movable structure and an adjacent arm of the bridge is inductively coupled to other circuitry including a variable resistor whose value is controlled to maintain a null condition at the bridge output terminals thereby maintaining a known ratio between the variable resistor and the first resistor. Resistance of the variable resistor is then measured with DC circuitry and a DC output representative of the first resistor is provided. In a preferred embodiment the variable resistor comprises a photosensitive resistor controlled by a light source which is powered by an amplifier having its input connected to the AC bridge output terminals. Also the DC measuring circuits incorporate signal linearization features so that non-linearity between the first resistor and a condition being measured may be compensated to provide a linear output signal proportional to the condition being measured.

It is therefore a primary object of the invention to provide circuit means for accurate measurement of a resistor mounted on a moving structure.

It is a further object of the invention to provide a DC output signal proportional to a condition being sensed by a resistor where the sensing resistor is attached to structure relatively movable with respect to the DC output circuit.

It is a further object to provide a system for measuring the temperature of the shell portion of a heated rotating roll where the temperature is sensed by means of a resistance thermometer attached to the shell and said resistance thermometer is AC coupled to stationary circuit components where a DC signal is provided proportional to temperature of the rotating roll.

BRIEF DESCRIPTION OF THE DRAWINGS

FIG. 1 is a part cross-sectional side elevational view of a heated roll assembly having a temperature sensing device mounted in a rotary member at one end and having a non-contacting electrical coupling device at the other end;

FIG. 2 is a detailed schematic showing a preferred circuit embodiment for the invention; and FIG. 3 is an electrical block schematic of a sensing and control system for an assembly such as shown in FIG. 1.

DESCRIPTION OF THE PREFERRED EMBODIMENT

A rotatable member shown as a heated roll 10 is driven by motor 12 through a hollow shaft 14. One end of the shaft 14 is attached to roll 10 at projection 16 and the other end of shaft 14 connects to one half 18 of a rotary transformer assembly 20. The other half 22 of the rotary transformer connects to the stationary motor frame 13. Each half of rotary transformer 20 preferably comprises a transformer winding 19 and 21 respectively and pole pieces as shown to provide good coupling between the stationary and moving windings.

A temperature sensor 24 is embedded in roll 10 and is connected to transformer winding 19 by means of cable 16 which passes through hollow shaft 14. Sensor 24 is preferably a platinum resistance thermometer but may be a thermistor or other electrical thermometer device. A heater is shown at 26 for supplying heat to roll 10. The heater winding is preferably an induction heater wound stationary with respect to roll 10 and arranged in known manner to inductively couple alternating current into roll 10 to provide heat directly in the roll through resistive losses in the roll. Pole piece 27 may be provided to increase the inductive coupling between coil 26 and roll 10. The heater 26 may be a resistance heater or any other desired form of heater.

In operation heat is applied by means of heater 26 which is supplied power from controller 29. Controller 29 responds to signals from a signal conditioner 30 which is responsive to thermometer 24. Controller 29 may also include means providing a reference signal for comparison with the signal from signal conditioner 30 so that the heater maintains the roll at a prescribed temperature. Controller 29 and heater 26 may be of various designs known in the art. However, signal conditioner 30 in conjunction with transformer 20 and thermometer 24 is of the preferred design shown in FIG. 2 and as explained below.

A comparison network in the form of an impedance bridge 32 comprising two parallel branches is energized at its input terminals 31 and 33 by AC generator 34. The input terminals of a differential input amplifier 36 are connected across the bridge output terminals 35 and 37. A first branch of bridge 32 comprises a fixed resistor 38 in one arm and capacitance 40 and transformer winding 21 in the other arm. The resistance of sensor 24 is coupled into this first branch through the inductive coupling between rotating winding 19 and stationary winding 21. The second branch of bridge 32 similarly comprises a resistance arm 42 and an adjacent arm comprising capacitor 43 and a transformer winding 44. Winding 44 is AC coupled to a winding 46 and winding 46 is connected across the series combination of a DC blocking capacitor 47 and a resistor 48. Resistor 48 is thus coupled into bridge 32 in the same manner as sensor resistor 24 and the bridge will be balanced only at a prescribed ratio of resistor 24 to resistor 48. This ratio may be unity or some other convenient value which is established by the other bridge components.

When the motor 12 is rotating and the bridge 32 is excited, any change in the resistance of resistor 24 results in a voltage change in the winding 19, which is also rotating. The voltage change in winding 19 results in a change in voltage in the winding 21 to in turn change the voltage at terminal 35. This bridge output is coupled to the input of amplifier 36.

The magnitude of resistance of resistor 48 is controlled by the output of amplifier 36, which output is responsive to the input signals to amplifier 36 to always maintain a balanced bridge condition. Consequently, in operation, the magnitude of resistance of resistor 48 always has a known relation to the magnitude of resistance of sensor 24 and thus the temperature of roll 10. As shown, resistor 48 is a photosensitive resistor and its resistance is controlled by means of light source 50 which receives its energization as a result of being connected between the output terminal 39 of amplifier 36 and power return terminal 33. Power excitation for amplifier 36 is delivered from DC source 52 to line 51 and to amplifier 36, and thence to ground. Amplifier 36 preferably comprises a peak detector input stage, a DC amplifying stage and a power control stage, all such elements being known in the art. The power control stage controls the DC level between terminals 39 and 33 and hence the power delivered through light source 50. It is important to DC isolate resistor 48 from transformer winding 46 and amplifier 36 and the isolation is preferably achieved by the described circuitry. Note also that since resistor 48 and winding 46 are DC isolated from the comparison bridge circuit 32 it is possible to ground line 53 if desired. Alternately, resistor 48 could be a variable resistor controlled through an electromechanical servo driver from amplifier 36 or controlled through other isolating means.

Since the magnitude of resistance of resistor 48 faithfully corresponds to the magnitude of resistance of resistor 24 through an AC bridge means and amplifier circuits described above, it can be further connected in separate DC circuits without disturbing the AC bridge balance conditions.

One end of resistor 48 is connected to line 53 and the other end connects to junction 56. Resistor 58 connects from junction 56 through resistor 60 to line 51 and hence to DC source 52. Zener diode 62 is connected from the junction of resistor 58 and 60 to line 53 and thus maintains a known voltage across the series combination of resistor 58 and 48. The voltage signal at junction 56 is connected to the input of a buffer amplifier 64 through a resistor 65. The signal at junction 56 is dependent upon the resistance of resistor 48, and therefore resistance changes in the resistor 48 which occur to balance bridge 32 result in a corresponding signal change at 56. Amplifier 64 is energized by being connected between lines 51 and ground and is provided with negative feedback to give essentially unity gain. The output of amplifier 64 is connected to one output terminal 66 of the signal conditioner 30 and line 53 is connected to the other output terminal 68 of the signal conditioner 30. A filter capacitor 69 is connected between terminals 66 and 68. Another capacitor 67 which acts as a DC block and also provides filtering is connected between the input of amplifier 64 and line 53.

The signal at terminal 66 corresponds to the resistance of resistor 48 because the output of amplifier 64 is directly dependent on the voltage signal at 56, which in turn corresponds to the resistance of resistor 48.

This circuit also provides a linearizing feature so that by proper selection of resistors, the output signal at terminal 66 may be made directly proportional to the condition being measured (e.g., temperature) even though resistor 24 is not precisely directly proportional to the condition being measured. As shown, a linearizing correction of the proper sign for a platinum thermometer is provided. If resistor 24 is a resistance thermometer such as platinum it will exhibit a slightly decreasing sensitivity (change in resistance per degree temperature change) with increasing temperature. Since resistor 24 is coupled directly into bridge 32 through transformer 20 a proportional resistance must be coupled into the bridge through transformer 45. The proportionality constant is dependent upon transformer ratios and other bridge components. However, considering the AC circuit associated with bridge 32, resistor 48 is shunted by resistor 58 and by resistor 65. The impedance of diode 62 and of capacitor 67 is insignificant and thus the resistance reflected into bridge through transformer 45 is less than that value which would occur if resistor 48 was not shunted by further fixed value resistors. Consequently, an increase in resistance of resistor 24 requires a greater relative increase in resistance of resistor 48 to balance bridge 32. A measurement of the magnitude of resistor 48 is made by impressing a known DC voltage across the series combination of fixed resistor 58 and variable resistor 48 and measuring the DC voltage across resistor 48 by means of buffer amplifier 64. Resistor 65 provides no shunting effect for this measurement since capacitor 67 acts as a DC block. The DC voltage at junction 56 as measured by amplifier 64 increases at a relatively greater magnitude compared to an increase in magnitude of resistance of resistor 24 and with proper selection of resistors, the voltage at junction 56 is made substantially directly proportional to the temperature sensed by resistor 24. The optimum selection of circuit components may be made through analytical and/or experimental procedure. If no linearity compensation is required, resistor 65 may simply be made large compared to resistor 48 so the shunting effect is negligible. A linearizing correction of the opposite sign to that described above may readily be obtained by shunting resistor 24 with a separate fixed value resistor that is also carried on the rotating roll.

The invention described herein is not restricted for application to temperature measurement and control of a heated roll. Other applications include temperature measurements of centrifuge test equipment, turbines, extruder screws and reciprocating engine parts. Other applications include strain measurements on moving structures through use of a resistance strain gauge in place of the resistance thermometer specifically described herein. An outstanding feature of the invention is the provision of circuitry, requiring only a minimum number of active components, which accurately transduces a resistance sensor signal measured on a relatively moving structure into a voltage signal on a stationary structure. The preferred embodiment shown employs an AC non-contact coupling device in the form of transformer windings, however, it is apparent that non-contact capacitor plates could be used in place of the transformer windings and may be preferred for applications where it is desirable to use a high frequency excitation for the comparison bridge.

What is claimed is:

1. A measurement system comprising an impedance comparison network mounted on a first member, a first resistor which varies as a function of a condition to be measured mounted on a second member, said members being mounted for relative motion therebetween, first AC coupling means providing non-contacting electrical coupling of the first resistor into the comparison network, a second adjustable resistor, second AC coupling means connected to the second resistor and providing electrical coupling into the comparison network, first signal means connected to the comparison network to provide a control signal responsive to relative magnitudes of the first and second resistors, control means responsive to the control signal to adjust the magnitude of said second resistor to maintain a predetermined ratio magnitudes between the first and second resistors, and separate circuit means connected to the second resistor to provide an output signal which is a function of the magnitude of the second resistor whereby the output signal varies as a function of the condition to be measured.

2. The system of claim 1 wherein the first AC coupling means comprises a rotary transformer having a first winding connected to the first resistor and a second winding connected to the comparison network and wherein the first winding and first resistor are mounted for movement relative to the comparison network.

3. The system of claim 2 in combination with a rotatably mounted roll, means mounting said first resistor and first winding to rotate with the roll, and wherein the first resistor varies as a function of the roll temperature.

4. The system of claim 3 including heater means for the roll, a heater controller, and means coupling the output signal to the controller, said controller regulating said heater as a function of the output signal.

5. The system of claim 1 wherein the separate circuit means providing an output signal includes a DC source connected to the second resistor, and DC amplifier means responsive to the magnitude of the second resistor.

6. The system of claim 5 and an AC shunt path including a DC blocking capacitor connected across said second resistor.

7. The system of claim 6 wherein the first resistor is a platinum thermometer and the AC shunt path is of such magnitude to cause a slightly greater relative magnitude adjustment in the second resistor relative to a magnitude change in the first resistor due to a temperature change, so that the magnitude of the second resistor is substantially proportional to temperature.

8. The system of claim 1 wherein the control means includes a light source connected to the output of said first signal means and the second resistor is a photosensitive resistor responsive to said light source.

9. The system of claim 8 wherein the first signal means includes an AC peak detector connected to the comparison network and a DC amplifier responsive to the peak detector and connected to the light source to adjust the magnitude of the second resistor in response to signals from the comparison network.

10. A circuit for delivering an output to indicate the magnitude of a variable condition from a transducer mounted on an object moving relative to means mounting a major portion of the circuit, said transducer comprising a first condition responsive resistor, a first transformer winding, said first resistor being connected in series with the first transformer winding, said first resistor and first transformer winding being mounted on said object that has relative motion to said circuit mounting means, said major portion of said circuit mounted on said mounting means including an impedance comparison network having input excitation terminals and output signal terminals, said network including a second transformer winding inductively coupled to said first transformer winding, and a third transformer winding connected in said impedance comparison network for impedance comparison with said second transformer winding, a fourth transformer winding inductively coupled to said third transformer winding, a second adjustable resistor in series circuit with said second transformer winding, control means to provide adjustment of the resistance of said second resistor, signal conditioning means connected to said output terminals responsive to changes in the ratio of impedance between said second transformer winding and said third transformer winding, and coupled to said control means to change the resistance of said second resistor to maintain a predetermined relationship of impedance between the second and third transformer windings, and separate second circuit means connected to said second resistor including sensing means to sense changes in said second resistor.

11. The combination as specified in claim 10 wherein said signal conditioning means comprises an amplifier having input terminals sensitive to changes in signal at said output terminals of said impedance comparison network, said amplifier having an output to change the value of said second resistance means.

12. The combination as specified in claim 10 wherein said sensing means includes a second amplifier, said second amplifier delivering an output proportional to the change in resistance of said second resistor.

* * * * *

PO-1050
(5/69)

UNITED STATES PATENT OFFICE
CERTIFICATE OF CORRECTION

Patent No. 3,674,963                    Dated  July 4, 1972

Inventor(s)  Leonardo V. Serrano

It is certified that error appears in the above-identified patent and that said Letters Patent are hereby corrected as shown below:

Column 4, line 64, after "ratio" insert --of--.

Signed and sealed this 2nd day of January 1973.

(SEAL)
Attest:

EDWARD M. FLETCHER, JR.                 ROBERT GOTTSCHALK
Attesting Officer                       Commissioner of Patent